UNITED STATES PATENT OFFICE.

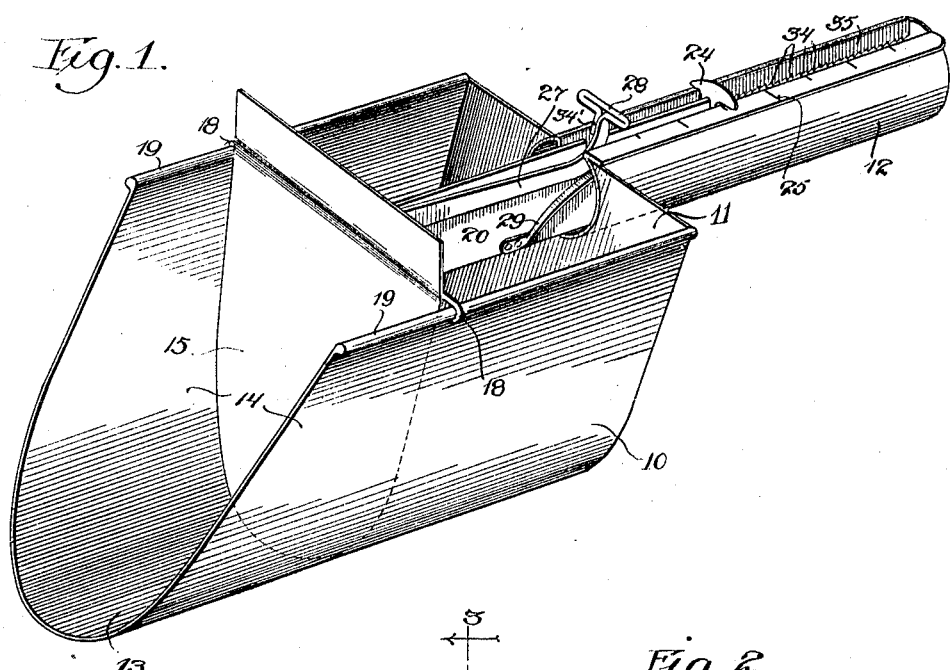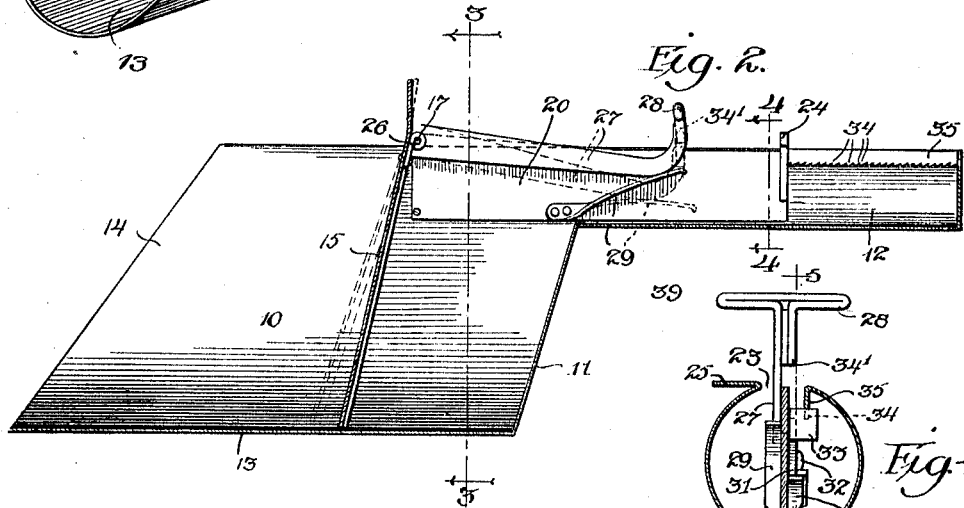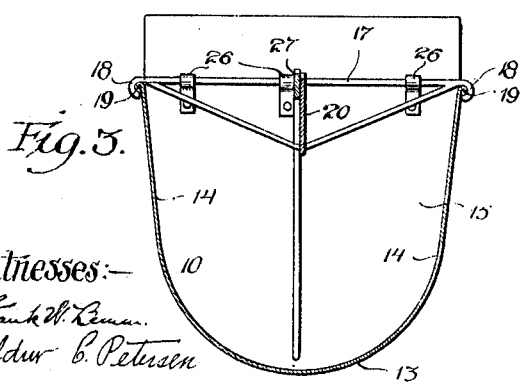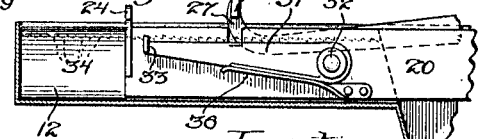

CHRISTIAN E. SKYUM, OF CHICAGO, ILLINOIS.

SCOOP.

993,560.  Specification of Letters Patent.  Patented May 30, 1911.

Application filed June 14, 1909. Serial No. 502,022.

*To all whom it may concern:*

Be it known that I, CHRISTIAN E. SKYUM, a resident of Chicago, in the county of Cook and State of Illinois, have invented certain new and useful Improvements in Scoops, of which the following is a full, clear, and exact description.

The invention relates to scoops, such as are generally used by grocers or for material in bulk, and designs to provide a scoop with an adjustable back or diaphragm so that in weighing the material or when it may be desired to remove a given quantity or weight of material, a predetermined load will be held in the scoop, to facilitate the measuring or weighing of the material. In many places, the scale is not always in close proximity to the receptacle containing the material and in placing the material on the scale it is frequently necessary for the clerk to make two or three trips from the bin or receptacle to the scale before the desired quantity or weight of material has been placed on the scale or a receptacle thereon.

The invention provides a scoop which is adjustable to adapt it to hold different loads and which is provided with means for indicating, approximately at least, the amount of material in the scoop when it is loaded. Resultantly, when a given weight of material is to be removed from a bin or receptacle, the scoop may be adjusted to hold substantially the amount desired, so that when it is once filled and carried to the scale, it will not be necessary for the clerk to return to the bin for more material to supply a deficiency, the adjustable diaphragm for the scoop being set, if desired, so that it will hold a little more than the given weight to make certain that the load will not be less than the weight desired.

The invention further designs to provide an improved scoop in which the adjustable back or diaphragm may be readily shifted to hold different quantities of material and in which the back will be securely held or locked in assigned position.

The invention consists in the several novel features hereinafter set forth and more particularly defined by claims at the conclusion hereof.

In the drawings: Figure 1 is a perspective of a scoop embodying the invention. Fig. 2 is a central longitudinal section. Fig. 3 is a section taken on line 3—3 of Fig. 2. Fig. 4 is a section on an enlarged scale taken on line 4—4 of Fig. 2. Fig. 5 is a section taken on line 5—5 of Fig. 4.

The improved scoop comprises a body 10 and a fixed back 11. A hollow tubular handle 12 extends rearwardly from and is secured to the fixed back. The body of the scoop may be of any suitable form, the one shown being similar to a form now in general use, having a round bottom 13 and sides 14, the front of the scoop being open to receive the material or permit the scoop to be pushed into a quantity of material and to permit the discharge of the material.

An adjustable back or diaphragm 15 extends across the space in the scoop-body in substantially parallel relation with the fixed back 11 and the edges of this adjustable back or diaphragm normally fit snugly against the sides and bottom of the scoop-body, so that the material will be confined to the space in front of the diaphragm and cannot pass into the space between the diaphragm and the fixed back of the scoop. The diaphragm is mounted on a cross-bar or frame 17 which may be formed of wire and the ends of this frame are provided with hooks 18 adapted to fit around and slide along the beaded or reinforced edges 19 of the sides of the scoop, to guide the diaphragm longitudinally in the scoop. The frame 17 is connected to the front end of a stem 20 which extends rearwardly and is adapted to travel in the hollow-handle 12, and which fits in a slot 23 in the upper portion of the handle. An index 24 is provided on the stem to indicate the quantity of material which the scoop is adapted to hold, on a scale 25 marked on the handle, so that the clerk can determine the quantity of material or weight of the load in the different positions in the scoop-body.

In practice, it is desirable that the diaphragm should be secured in assigned position so that it will not be easily displaced when the scoop is being pushed into the material to receive a load. It is also desirable to have the edge of the diaphragm snugly engage or fit against the scoop-walls, but to relieve this pressure when the diaphragm is to be adjusted. For this purpose, the diaphragm is pivotally connected by means of lugs 26 to the frame 17 so that the diaphragm may be shifted slightly, as indicated by dotted lines in Fig. 2, to facilitate the adjustment of the diaphragm. A lever 27 is rigidly secured to the back of the diaphragm and is disposed at one side of the stem 20 and a finger-piece 28 is provided at the back end of lever 27, so that by pressing the finger-piece downwardly, the diaphragm will be shifted slightly about its pivotal connection with frame 17, to release the pressure of the diaphragm against the walls of the scoop. A leaf-spring 29 secured to the stem 20 exerts an upward pressure on the lever 27 to cause the diaphragm to be normally held, so that its edge will fit snugly against the wall of the scoop, as shown in full lines in Fig. 2.

To securely hold the diaphragm against displacement, locking-means are provided, whereby the diaphragm and stem will be secured against backward shift. This locking-means comprises a dog 31 which is pivoted to the stem 20 at 32 and is provided at its free end with a laterally extending lug or hook 33, which is adapted to engage with teeth 34 formed at the lower edge of an inturned lip or rib 35 on the handle. The handle being hollow and formed of sheet metal, the lip 35 is formed by inturning inwardly, the metal at one side of slot 23. Dog 31 is normally held into engagement with the rack-teeth 34 by a spring 36, and thus holds the diaphragm and stem 20 against longitudinal backward movement in the scoop-body. To release the diaphragm and stem so that the diaphragm may be adjusted to any desired point in the scoop, the lever 27 is provided with an abutment 34′ which is adapted to engage dog 31 and depress it against the force of spring 36 and thus release said dog from engagement with rack-teeth 34.

When adjustment of the diaphragm to adapt the scoop to receive any desired load is desired, it is merely necessary to operate lever 27 by depressing finger-grip 28. The initial movement of the lever will cause the diaphragm to swing forwardly slightly to avoid the friction of the diaphragm against the scoop walls and further movement of the lever will cause abutment 34′ to shift dog 31 and disengage it from rack-teeth 34.

To permit a firm grip to be obtained on the handle, it is usually provided with a lip or hook 39 adapted to receive the forefinger of a hand. The entire shifting operation may be conveniently effected by one hand because the finger-piece 28 is conveniently positioned for both vertical and longitudinal movement by the thumb when the handle 12 is held in the palm of the hand.

The invention provides a simple scoop, which may be quickly and conveniently adjusted to receive different loads, which will materially aid a clerk in measuring or weighing material. The locking-means for holding the diaphragm in assigned position is simple in construction and may be conveniently operated by the thumb of the hand in which the handle of the scoop is held. The diaphragm is normally held to fit snugly against the walls of the scoop to prevent the material from being forced into the space in back of the diaphragm and during adjustment, it is shifted to ease the pressure against the scoop-walls and facilitate its longitudinal movement in the scoop.

The invention is not to be understood as restricted to the particular details shown and described since this may be modified within the scope of the appended claims without departing from the spirit and scope of the invention.

Having thus described the invention what I claim as new and desire to secure by Letters Patent, is:

1. A scoop, comprising a body for holding the material, an imperforate diaphragm mounted on said body, a slidable member to which said diaphragm is pivoted so as to tilt to lock against movement in one direction, and means for locking said diaphragm against movement in the other direction.

2. A scoop comprising a body for holding the material, a diaphragm adjustably mounted in the body to adapt the latter to hold different quantities of material, means for automatically locking the diaphragm against backward movement in the scoop, and separate means connected with said diaphragm for releasing the locking-means.

3. A scoop, comprising a body for holding the material, a diaphragm, and a slidable member to which said diaphragm is pivoted whereby said diaphragm may tilt so as to engage the wall of the scoop and automatically lock against movement in one direction.

4. A scoop, comprising a body for holding the material, a diaphragm having its edges normally engaging said body, means mounted on said body for adjustably moving said diaphragm longitudinally of said body, and means for shifting the edges of said diaphragm away from the bottom without varying the longitudinal adjustment of said diaphragm.

5. A scoop, comprising a body for holding the material, a diaphragm having its edges normally engaging said body, a member to which said diaphragm is pivoted, and means for tilting said diaphragm on said pivot to move its edges away from said body.

6. A scoop comprising a body for holding the material, a diaphragm adjustably mounted in said body for adapting the scoop to hold different quantities of material, a stem connected to said diaphragm and in the back thereof, means secured to the body of the scoop and in which said stem is guided, means for locking the diaphragm and stem against movement, and means connected with said diaphragm for releasing the locking-means.

7. A scoop comprising a body for holding the material, a diaphragm adjustably mounted in the body and having its edges movable away from the body, means for locking the diaphragm against backward movement, and means for conjointly shifting the diaphragm to disengage its edges from the body and for releasing the locking-means.

8. In a scoop, the combination of a body for holding material, an adjustable diaphragm for adapting it to hold different quantities of material, a stem connected to the diaphragm, a rack connected to the body, a latch for engaging the rack and mounted on the stem, and means for releasing the latch.

9. In a scoop, the combination of a body for holding material, a diaphragm adjustably mounted in the body for adapting the scoop to hold different quantities of material, a stem connected to the diaphragm, a rack connected to the body, a latch for engaging the rack and mounted on the stem, and means for releasing the latch comprising a lever mounted on the stem.

CHRISTIAN E. SKYUM.

Witnesses:
FRANK W. BEMM,
HILDUR C. PETERSEN.